United States Patent
Lloyd et al.

(10) Patent No.: US 7,183,971 B1
(45) Date of Patent: Feb. 27, 2007

(54) HYBRID TRANSLATOR IN A GLOBAL POSITIONING SYSTEM (GPS)

(75) Inventors: Rick R. Lloyd, Orange, CA (US); Lawrence L. Wells, Tehachapi, CA (US); Richard Redhead, Mission Viejo, CA (US)

(73) Assignee: Interstate Electronics Corporation, Anaheim, CA (US)

( * ) Notice: Subject to any disclaimer, the term of this patent is extended or adjusted under 35 U.S.C. 154(b) by 838 days.

(21) Appl. No.: 10/255,855

(22) Filed: Sep. 26, 2002

Related U.S. Application Data

(60) Provisional application No. 60/325,361, filed on Sep. 26, 2001.

(51) Int. Cl.
*G01S 5/14* (2006.01)

(52) U.S. Cl. .................................. 342/357.09
(58) Field of Classification Search ............ 342/357.09
See application file for complete search history.

(56) References Cited

U.S. PATENT DOCUMENTS

| | | | | |
|---|---|---|---|---|
| 4,622,557 | A | * 11/1986 | Westerfield ............ | 342/357.09 |
| 5,379,224 | A | * 1/1995 | Brown et al. ................ | 701/215 |
| 5,420,592 | A | * 5/1995 | Johnson .................. | 342/357.12 |
| 5,594,454 | A | * 1/1997 | Devereux et al. ...... | 342/357.09 |
| 5,729,235 | A | * 3/1998 | Guthrie et al. ......... | 342/357.12 |
| 5,999,561 | A | * 12/1999 | Naden et al. ................ | 375/142 |
| 6,430,503 | B1 | * 8/2002 | McBurney et al. ......... | 701/213 |
| 6,532,271 | B1 | * 3/2003 | Hwang et al. .............. | 375/326 |
| 6,633,255 | B2 | * 10/2003 | Krasner .................. | 342/357.12 |

OTHER PUBLICATIONS

Thompson, Thomas et al, "Global Positioning System Translators for Precision Test and Evaluation," Johns Hopkins APL Technical Digest, vol. 19, No. 4, 1998, pp. 448-458.*
Braasch, Michael et al, "GPS Receiver Architectures aned Measurements," Proc. of the IEEE, vol. 87, No. 1, Jan. 1999, pp. 48-64.*
L3 Communications, Interstate Electronics Corporation, Translated GPS (online), Oct. 12, 2000, (retrieved on Sep. 3, 2002). Retrieved from the Internet: <URL:http://www.iechome.com/gps/translat.htm>.

(Continued)

*Primary Examiner*—Gregory C. Issing
(74) *Attorney, Agent, or Firm*—Knobbe Martens Olson & Bear LLP

(57) ABSTRACT

A system for tracking high-dynamic targets by relaying semi-processed GPS signals to a remote signal processing station with a relatively small and efficient bandwidth is described. Such processed GPS signals can be provided in a high-dynamic environment without the assistance of an inertial measurement unit (IMU). One embodiment includes a hybrid translator that is a hybrid between a full GPS navigation system and a translator system. The modulated GPS signals, such as modulated C/A codes, are pre-processed to reduce the amount of information required to reconstruct the GPS signal received by the hybrid translator. For example, the GPS signals can be processed to a pseudo-range measurement and an indication of an amount of corruption of delta range in the pseudo-range measurement, which are then provided to signal processing at a remote location, such as at a ground station, via a wireless downlink.

14 Claims, 7 Drawing Sheets

OTHER PUBLICATIONS

Kaplan, E.D., *Understanding GPS Principles and Applications* 1996, pp. 139-142, 154, 156, 164-167.

Rao, P.M., et al, "Coherent Carrier Regeneration Using a Ling Loop PLL Technique," [online] Retrieved from the Internet: <URL:http://www.amwireless.com/archives/1998/May1998/may1998-p28.pdf, Downloaded on Sept. 6, 2002>.

Steber, J. Mark, "PKS Demodulation (Part 1)," [online]. Retrieved from the Internet: <URL:http://www.wj.com/pdf/technotes/PSK_demod_part1.pdf, Downloaded on Sep. 6, 2002>.

Hagermann, Eric, "The Costa Loop—An Introduction," [online] Retrieved from the Internet: <URL:http://www.chipcenter.com/dsp/images/dspsourced/DSP010315F1.pdf, Downloaded on Sep. 6, 2002>.

* cited by examiner

HYBRID TRANSLATOR IN A GLOBAL POSITIONING SYSTEM (GPS)

RELATED APPLICATION

This application claims the benefit under 35 U.S.C. § 119(e) of U.S. Provisional Application No. 60/325,361, filed Sep. 26, 2001, the entirety of which is hereby incorporated by reference.

BACKGROUND OF THE INVENTION

1. Field of the Invention

The invention is generally related to Global Positioning System (GPS) receivers, and in particular, to partial processing of a GPS signal for relaying to a remote processing station.

2. Description of the Related Art

The Global Positioning System (GPS) Operational Constellation nominally comprises 24 earth orbiting satellites. Each satellite radiates a spread spectrum, pseudorandom noise (PN) signal indicating the satellite's position and time. A GPS receiver tuned to receive the signals from the satellites can compute the distance to the satellites and calculate the receiver's position, velocity, and time. The receiver calculates the distance to a satellite by multiplying the propagation rate of the satellite's radio signal, i.e., the speed of light, by the time it took the signal to travel from the satellite to the receiver.

Each satellite transmits two carrier signals referred to as L1 and L2. L1 operates at a frequency of 1.57542 GHz and L2 operates at a frequency of 1.22760 GHz. Multiple binary codes induce phase modulation upon the L1 and L2 carrier signals. Each satellite in the GPS Operational Constellation transmits a unique code over the L1 and L2 carrier signals. One of the phase-modulated signals is C/A Code (Coarse Acquisition Code). Presently, 32 codes are defined for the C/A Code. A satellite's C/A Code phase modulates the L1 carrier over a 1.023 MHz bandwidth. The C/A Code is a repeating 1023 bit sequence. At 1023 bits and 1.023 MHz, the C/A Code repeats every millisecond. The C/A Code forms the basis for the Standard Positioning Service (SPS) used by civilians.

Another phase-modulated signal is the P-Code (Precise Code). The P-Code is similar to the C/A Code in that it is a PN sequence which phase modulates a carrier signal. The P-Code modulates both the L1 and the L2 signals at a rate of 10.23 MHz. In an Anti-Spoofing mode, the P-Code is encrypted to produce the Y-Code to restrict access to users with the encryption key. The P-Code forms the basis for the military's Precise Positioning Service (PPS). It will be understood that additional signals can be added to existing carriers or to additional carriers.

One use of GPS is tracking of a moving vehicle. A GPS receiver is mounted in a vehicle, and the GPS receiver sends information to a remotely located base station. Such information can be used for testing and evaluation of the vehicle's performance, for precise information regarding the location of the vehicle at a particular time, and the like. Some vehicles present high-dynamic environments to the GPS receiver and are difficult to track with precision. Examples of high-dynamic environments with large amounts of acceleration (g-forces) and jerk (rate of change of acceleration) include reentry vehicles, high-performance aircraft, racing cars, and the like. Unmanned vehicles, such as interceptor missiles and munitions, can feature even higher dynamics than manned vehicles. For example, an interceptor missile can exhibit acceleration rates of up to 75 g's and jerk rates of up to 75 g's per second.

Knowledge of the location of a high-performance vehicle is instrumental for safety. For example, if a prototype unmanned aircraft is being tested at supersonic speeds, it may be desirable for testing personnel to possess accurate real-time information about the test plane's position and velocity. Should the tracking provided by the GPS receiver indicate that the test plane is out of control or is lost, a range safety officer may decide to destroy the test plane due to safety concerns. An inaccurate or unreliable GPS receiver may also evoke a similar response from the range safety officer, which can undesirably result in the needless waste of expensive prototypes and loss of development time. Other high-dynamic environment tracking applications include downrange tracking, midcourse platform correction, and miss-distance calculations.

Standard, off-the-shelf GPS receivers do not perform well in high-dynamic environments. Due to the relatively great distance between a GPS receiver and a GPS satellite, the received GPS signal strength is low, and a carrier phase locked loop (PLL) in a GPS receiver typically has relatively narrow bandwidth. Relatively high dynamics induce tracking errors in these narrow-band carrier phase locked loops. The component of vehicle dynamics that stresses a carrier loop is the projection of the vehicle motion vector onto the satellite ray path to the vehicle. When these loop tracking errors are large enough, carrier cycles may be missed, which can lead to errors in position tracking. Under extreme conditions, the tracking errors can result in a complete loss of lock. Furthermore, the satellite signals that are least affected by dynamic events and are likely to remain in lock are also those that would provide the least information about tracking through the dynamic event, e.g., a signal from a satellite that is perpendicular to the direction of movement is least affected. These tracking errors render it impractical to use a standard unaided GPS receiver in an environment with more than about 12 g's of acceleration.

To cope with high-dynamic environments, a conventional GPS receiver may be augmented with an inertial measurement unit (IMU). The measurements of vehicle acceleration from the IMU are projected onto the various satellite raypaths and used to steer the corresponding satellite carrier tracking loop in the receiver to prevent tracking errors. Disadvantageously, such IMUs are large, expensive, and heavy.

GPS translation is another conventional technique that can be used in these high-dynamic environments. With GPS translation, a GPS receiver is apportioned to a GPS translator (front end) and a back end. The translator or front end of the GPS receiver is onboard the vehicle to be tracked. The back end can be conveniently located remotely, such as at a monitoring station on the ground, and the monitoring station can more easily accommodate advanced processing that is not practical to implement within the space and power confines of an on-board processor. A conventional translator system receives a signal and repeats the data received. To prevent interference between the received signal and the transmitted signal, the carrier frequency of the transmitted signal can be different than the carrier signal of the originally received signal. In a conventional translator system for GPS, a selected carrier channel, such as the L1 channel for C/A codes, is received by the translator and transmitted to the back end. It will be understood that even though the GPS satellites broadcast GPS signals at the same frequencies, the received frequencies from various satellites may vary due to Doppler shift. As a result, relatively many satellites may be tracked, and relatively many carriers may be translated. Disadvantageously, conventional translation techniques occupy relatively large amounts of bandwidth, thereby rendering conventional translation techniques impractical.

SUMMARY OF THE INVENTION

Embodiments of the invention advantageously overcome the disadvantages of the prior art. Embodiments of the invention provide for hybrid GPS translation that can advantageously provide position tracking in high dynamic environments without the need for large and expensive inertial measurement units (IMUs) and without the consumption of large amounts of data bandwidths. Such tracking devices can advantageously be used for a variety of purposes, such as the testing of missile defense systems. The GPS tracking devices provide tracking data that can be used for a variety of purposes, such as range safety, test scoring, locating air vehicles after flight, and the like.

Embodiments of the invention advantageously relay semi-processed GPS signals to a remote signal processing station in a relatively small and efficient bandwidth. One embodiment of the invention is a hybrid between a full GPS navigation system and a translator system. The modulated GPS signals, such as modulated C/A codes, are advantageously pre-processed to compress the amount of information required to reconstruct the GPS signal received by the hybrid translator. For example, the GPS signals can be processed to a pseudo-range measurement and an indication of an amount of corruption of delta range in the pseudo-range measurement, which are then provided to signal processing at a remote location via a wireless downlink.

One embodiment includes a hybrid GPS translator adapted to relay a semi-processed, reduced-bandwidth GPS signal, where the hybrid GPS translator includes: an input circuit configured to receive at least one set of baseband I and Q signals; a frequency measurement circuit configured to provide a frequency measurement associated with the input baseband I and Q signals, wherein the input baseband I and Q signals are downconverted from a GPS carrier signal; a phase-angle measurement circuit configured to provide a phase-angle measurement that indicates a phase difference between the baseband I and Q signals and a signal whose frequency corresponds to the frequency measurement; and an interface circuit coupled to the frequency measurement circuit and to the phase-angle measurement circuit to receive the frequency measurement and the phase-angle measurement, respectively, wherein the interface circuit is adapted to couple to a downlink circuit that can transmit the frequency measurement and the phase-angle measurement to a remote location.

Another embodiment includes a compressor circuit for GPS tracking information configured to provide a compressed data stream from input baseband I and Q signals, where the compressed data stream has fewer bits than the input baseband I and Q signals, where the compressed data stream includes an indication of a frequency of the input baseband I and Q signals and a phase deviation from the frequency and the input baseband I and Q signals.

Another embodiment is a data formatting circuit that includes an input circuit adapted to couple to a plurality of interface circuits, wherein the input circuit is configured to receive frequency measurements and phase-angle measurements for GPS carrier signals from the interface circuits; a formatting circuit adapted to collect the received frequency measurements and the received phase-angle measurements; and an output circuit adapted to provide the arranged data to a modulator circuit, where the arranged data includes frequency measurements and phase-angle measurements corresponding to multiple tracked GPS carrier signals.

Another embodiment is a hybrid GPS translator that provides an indication of a vehicle's position for tracking, where the hybrid GPS translator includes: a phase rotator adapted to receive baseband I and Q signals from an acquisition correlator and to receive an oscillator signal, wherein the phase rotator is configured to phase rotate the baseband I and Q signals in response to the frequency of the oscillator signal; an integrator coupled to the phase rotator, where the integrator is configured to approximately average an output of the phase rotator to an average phase angle that is calculated over an integration period and periodically provided as an output, where the integrator is further configured to provide its output as an output of the hybrid GPS translator; a frequency error detector coupled to and synchronized with the integrator, where the frequency error detector is configured to detect a frequency of the output of the integrator; a frequency-locked-loop (FLL) filter coupled to the frequency error detector to generate a control word output, wherein the control word output is provided as an output of the hybrid GPS translator; and a numerically controlled oscillator (NCO) coupled to the FLL filter, wherein the NCO is configured to vary a frequency of oscillation in response to the control word output of the FLL, wherein an output of the NCO is the oscillator signal for the phase rotator, wherein the phase rotator, the integrator, the frequency error detector, the FLL filter, and the NCO are arranged in a frequency locked loop (FLL) configuration.

One embodiment includes a hybrid GPS translator system that includes: a plurality of hybrid GPS translators, wherein a hybrid GPS translator is adapted to provide semi-processed, reduced-bandwidth GPS signals processed from baseband I/Q signals that are related to a carrier signal from a GPS satellite, wherein the plurality of hybrid GPS translators process signals for multiple GPS satellites; and a data formatter coupled to the plurality of hybrid GPS translators, where the data formatter is configured to arrange data from the hybrid GPS translators for transmission via a downlink.

One embodiment includes a signal processor adapted to receive partially processed and relayed GPS signals, where the signal processor includes: a receiver adapted to receive an RF signal, where the RF signal includes one or more of NCO control word signals and one or more of downlinked baseband I/Q signals that are derived from one or more baseband I and Q signals of one or more GPS carrier signals, where the receiver further downconverts and demodulates the RF signal to retrieve the NCO control word signals and the plurality of downlinked baseband I/Q signals; and an interface circuit configured to provide the plurality of NCO control word signals and the plurality of downlinked baseband I/Q signals to at least one of a real-time GPS translator processor and a data store.

One embodiment includes a hybrid GPS translator system that includes: means for detecting a frequency of received baseband I and Q signals despread from a GPS satellite carrier signal; means for sending an indication of the frequency, wherein the indication is provided in a full control word at a first rate and in a step at a second rate, where the second rate is faster than the first rate; means for detecting a phase deviation between the baseband I and Q signals and the indicated frequency; and means for sending an indication of the phase deviation.

One embodiment includes a method of translating a GPS signal in a bandwidth efficient manner, where the method includes: receiving baseband I and Q signals corresponding to at least one GPS satellite carrier signal; detecting a frequency of the baseband I and Q signals; sending an indication of the frequency, wherein the indication is provided in a full control word at a first rate and in a step at a second rate, where the second rate is faster than the first rate; detecting a phase deviation between the baseband I and Q signals and the indicated frequency; and sending an indication of the phase deviation.

One embodiment includes a method of translating a GPS signal in a bandwidth efficient manner, where the method includes: receiving baseband I/Q signals corresponding to at least one GPS satellite carrier; controlling a frequency of an oscillator signal with values of a control word signal; rotating the phase of the baseband I/Q signals in response to the frequency of the oscillator signal; integrating and dumping the rotated baseband I/Q signals to generate values for an average phase at periodic intervals; relaying the periodically generated average phase values; detecting the frequency corresponding to the average phase values and the periodic intervals; filtering the detected frequency to generate values for the control word signal; and relaying the control word signal.

One embodiment includes a method of compressing baseband I/Q signals in a hybrid GPS translator, where the method includes: preprocessing baseband I/Q signals to compress carrier phase information; and relaying the compressed carrier phase information in less occupied bandwidth than the baseband I/Q signals.

One embodiment includes a method of interpreting GPS translator messages that have been compressed, where the method includes: receiving downlinked baseband I/Q signals and NCO control words from a remote hybrid GPS translator; using the downlinked baseband I/Q signals and NCO control words to generate a first Doppler measurement from a phase locked loop; applying a Fourier Transform to the downlinked baseband I/Q signals; searching for a peak frequency from the Fourier Transform; summing the a value of the peak frequency with the NCO control word to generate a second Doppler measurement; comparing the first Doppler measurement and the second Doppler measurement; and selecting between the first Doppler measurement and the second Doppler measurement in response to the comparison.

One embodiment includes a method of processing a GPS translator message in non-real time such that a trajectory of a corresponding vehicle can be precisely calculated, where the method further includes: retrieving downlinked baseband I/Q signals and NCO control word signals from a data store; estimating a trajectory from a combination of phase locked loop (PLL) Doppler measurements and Fourier Transform Doppler measurements; estimating a vehicle motion vector based on the estimated trajectory; projecting the vehicle motion vector onto at least one of the received satellite ray paths; estimating an effect of a change in vehicle trajectory on a PLL measurement computation; and steering the PLL measurement computation in response to the estimated effect such that more of the trajectory can be estimated from the PLL Doppler measurement and less from the Fourier Transform Doppler measurement.

BRIEF DESCRIPTION OF THE DRAWINGS

These and other features of the invention will now be described with reference to the drawings summarized below. These drawings and the associated description are provided to illustrate preferred embodiments of the invention and are not intended to limit the scope of the invention.

DETAILED DESCRIPTION OF PREFERRED EMBODIMENTS

Although this invention will be described in terms of certain preferred embodiments, other embodiments that are apparent to those of ordinary skill in the art, including embodiments that do not provide all of the benefits and features set forth herein, are also within the scope of this invention. Accordingly, the scope of the invention is defined only by reference to the appended claims.

Embodiments provide tracking of high-dynamic targets without a large and expensive inertial measurement unit (IMU) and providing GPS signals to a remote signal processing station in a relatively small and efficient bandwidth. One embodiment of the invention includes a hybrid translator that is a hybrid between a full GPS navigation system and a conventional translator system. The modulated GPS signals, such as modulated C/A codes, are pre-processed to compress the amount of information needed to at least partially reconstruct the GPS carrier Doppler received by the hybrid translator.

While illustrated in the context of C/A codes, one of ordinary skill in the art will appreciate that the principles and advantages described herein are applicable to other acquisition codes, such as P(Y) codes and M codes.

Figure 1:
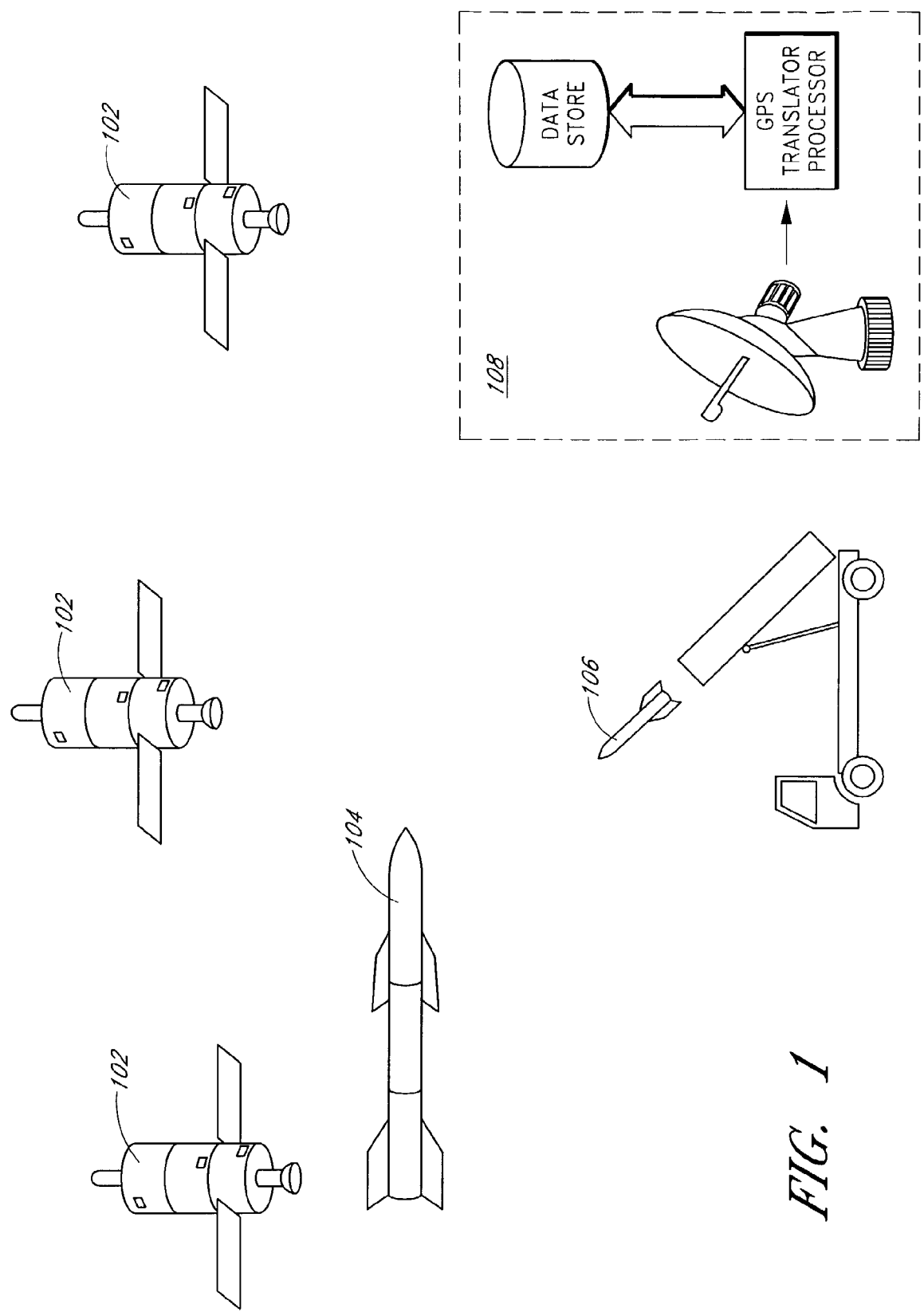
FIG. 1 illustrates two high-performance vehicles and a GPS translator system.

FIG. 1 illustrates two high-performance vehicles and a hybrid GPS translator system. Satellites 102 transmit their position and time via a spread spectrum, PN signal. A target missile 104 and an interceptor missile 106 carry hybrid GPS translators onboard for tracking. The hybrid GPS translators relay GPS signals to a signal processing station 108. The signal processing station 108 can process the relayed GPS signals in real time, can record and process the relayed GPS signals later in non-real time, or both. Real-time processing may be required in range safety applications. However, miss-distance calculations and trajectory analysis can often be more accurately performed in non-real time by a variety of techniques, such as combination with additional telemetry information from other sources, such as radar, by combination of tracking information from additional satellites that were not tracked in real time, by post-mission steering of tracking loops with known trajectory paths, and the like.

Figure 2:
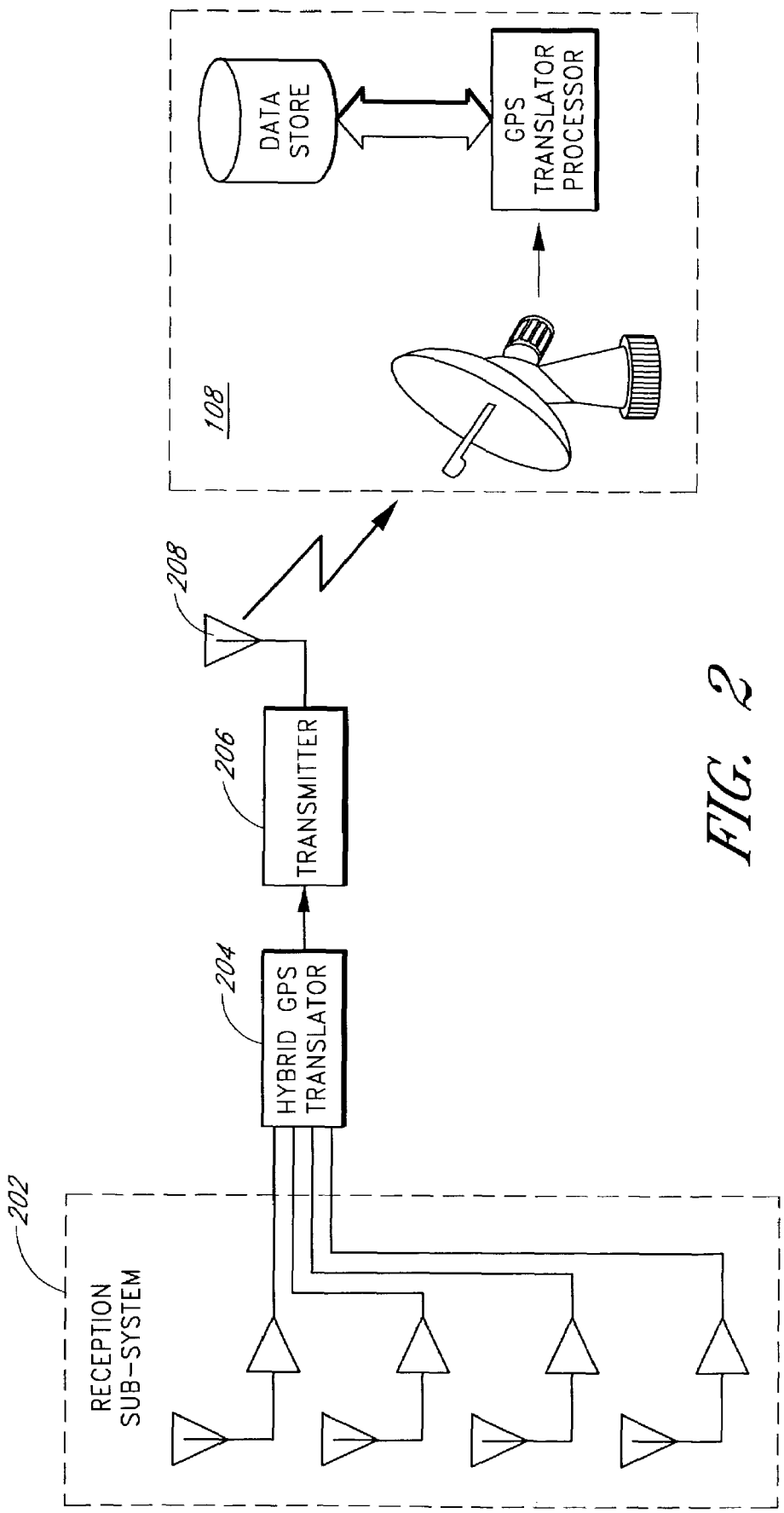
FIG. 2 illustrates a top-level block diagram of a hybrid GPS translator system.

FIG. 2 illustrates a top-level block diagram of a hybrid GPS translator system. The hybrid GPS translator system includes a reception sub-system 202, a hybrid GPS translator 204, a transmitter 206, a hybrid translator antenna 208, and the signal processing station 108. The reception sub-system 202 can include one or more array antennas, one or more low-noise front-end RF amplifiers, one or more downconverters (typically quadrature downconverters), and one or more acquisition correlators to receive and acquire GPS satellite signals. Although the reception sub-system 202 is illustrated in FIG. 2 with a multiple antenna array, embodiments can include a reception sub-system 202 with only one antenna element. The outputs of the reception sub-system 202 are provided as inputs to the hybrid GPS translator 204. One embodiment of the hybrid GPS translator 204 is described in greater detail later in connection with FIG. 4. An output of the hybrid GPS translator 204 contains tracking data with a relatively lower bandwidth than the output of a conventional GPS translator. The bandwidth will be described in greater detail later in connection with FIG. 3.

The output of the hybrid GPS translator 204 is provided as an input to the transmitter 206, which amplifies and broadcasts the hybrid GPS translator output over the hybrid translator antenna 208. It will be understood that the output of the hybrid GPS translator 204 can also be combined with data from other sources, such as telemetry devices. In one embodiment, the hybrid translated information is broadcast in S-band. The signal processing station 108 receives the hybrid translated signal and decodes the position of the vehicle in which the hybrid GPS translator 204 resides.

Figure 3:
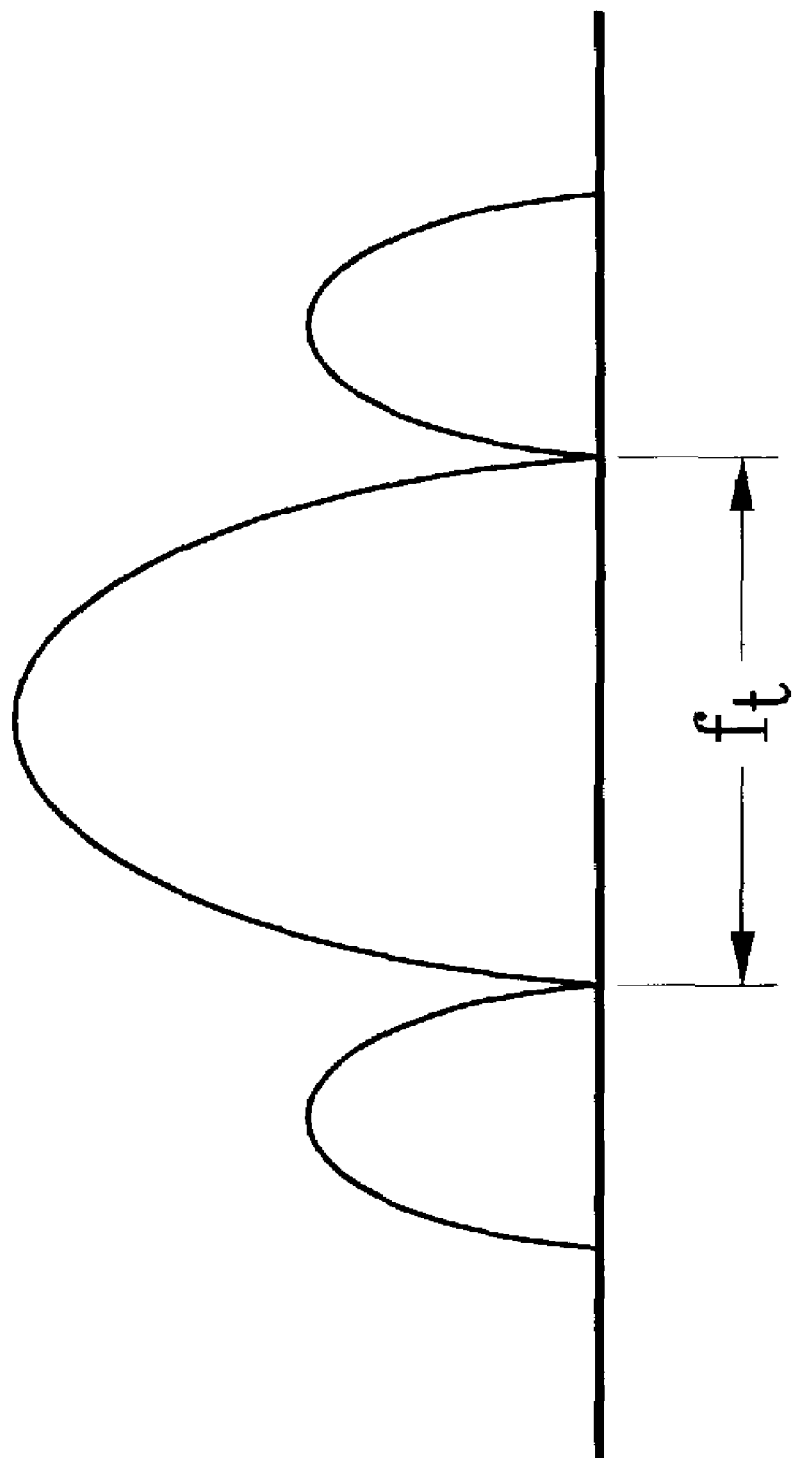
FIG. 3 illustrates a sample bandwidth for a hybrid translator system.

FIG. 3 illustrates a typical bandwidth for a hybrid translator system. The data from a hybrid GPS translator can occupy a relatively small bandwidth $f_t$ as compared to the bandwidth consumed by a conventional translator. For example, one embodiment of the hybrid GPS translator advantageously partially processes the GPS signals and needs only about 400 kilohertz (kHz) of bandwidth $f_t$ per received channel to translate the partially processed GPS signal. An example of a bandwidth budget is described later in connection with Table I.

By contrast, one example of a conventional translator system for GPS consumes about 4 MHz of bandwidth to translate a GPS signal from a satellite. A conventional translator system receives a signal and repeats the data received. To prevent interference between the received signal and the transmitted signal, the carrier frequency of the transmitted signal can be different than the carrier signal of the originally received signal. In a conventional translator system for GPS, a selected carrier channel, such as the L1 channel for C/A codes, is received by the conventional GPS translator and transmitted to the back end.

For example, in a conventional translator system for GPS, a selected carrier channel, such as the L1 channel for C/A codes, is received by the translator and transmitted to the back end. Multiple GPS satellites can be simultaneously tracked and the carriers of each translated. It will be understood that with pseudo-random noise spread spectrum modulation techniques, the same frequency channel can be used by multiple transmitters. In fact, the GPS satellites transmit at the same carrier frequencies. However, the dynamics of relatively fast vehicles results in significant Doppler frequency shifts in received carrier signals, which vary depending on the relative velocity between the vehicle and the satellite received. Thus, it may be desirable to track the carrier signals of multiple GPS satellites independently.

Disadvantageously, conventional translation techniques occupy relatively large amounts of bandwidth, thereby rendering conventional techniques impractical. For example, with conventional translation of C/A codes, a passband of about 1.8 MHz for the baseband signal of each received satellite signal is appropriate. In order to sample the modulated C/A codes without aliasing, the composite of the in-phase ("I") and quadrature phase ("Q") modulated baseband signals should be sampled at least at the Nyquist rate, e.g., 3.6 MHz in this example. Otherwise, the relayed information will be undesirably undersampled with a loss in accuracy. For example, if the baseband signal is undersampled by filtering at 0.9 MHz and sampling at 1.8 MHz, the reduction in bandwidth causes a degradation in the carrier-to-noise ratio of the resulting baseband signal. With the addition of error correction, parity, and modulation considerations, an occupied bandwidth for the conventional GPS translator for relaying of a GPS baseband signal is undesirably high, e.g., about 4 MHz.

This wide bandwidth of a conventional GPS translator may be impractical in a crowded frequency spectrum, particularly when other instrumentation devices are also transmitting telemetry information. Moreover, multiple vehicles can be tracked simultaneously, thereby increasing the number of transmitters that occupy bandwidth. For example, in a test of a ballistic missile target and an interceptor missile, both the ballistic missile target and the interceptor missile can be equipped with tracking devices.

Figure 4:
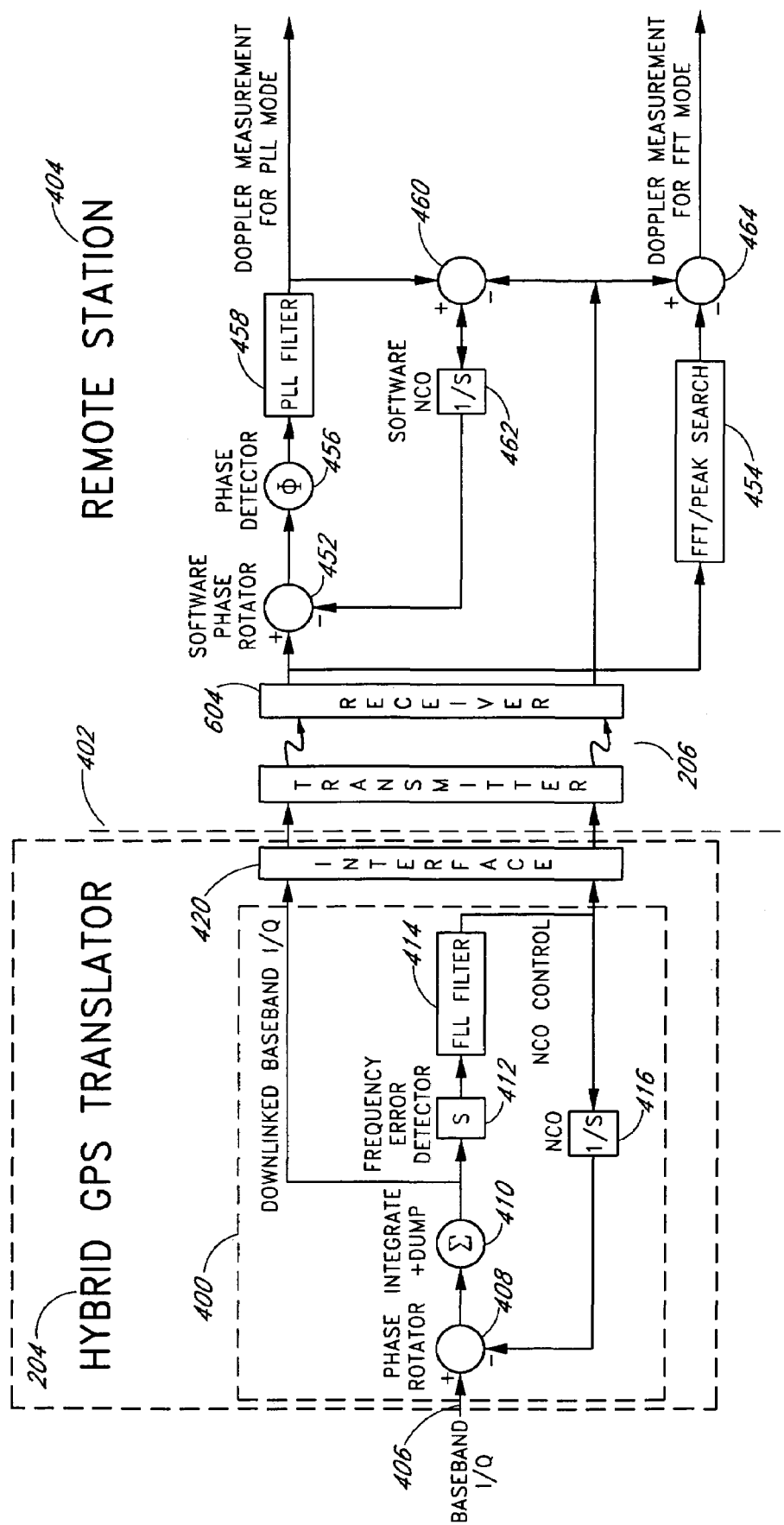
FIG. 4 illustrates a block diagram of a hybrid GPS translator system according to an embodiment of the invention.

FIG. 4 illustrates a block diagram of a hybrid GPS translator system according to an embodiment of the invention. A dashed box 400 indicates a frequency-locked loop. FIG. 4 also illustrates an interface circuit 420 coupled to the frequency-locked loop. A dashed line 402 visually separates the hybrid GPS translator 204 from corresponding signal processing at a remote station 404, such as the signal processing station 108 described earlier in connection with FIG. 1. For clarity, the circuitry for only one channel, i.e., one received satellite, is shown in FIG. 4. It will be understood that the hybrid GPS translator system can be configured to track multiple channels or satellites simultaneously. The number of channels tracked can vary in a very broad range. For example, the hybrid GPS translator system can be configured to track 12 channels at a time. In another configuration, the hybrid GPS translator system can be configured to track 8 channels. Also for clarity, many accompanying circuits or processes are not illustrated in FIG. 4 and are instead represented by the dashed line 402. For example, it should be understood that the hybrid GPS translator system can include other circuits or processes, such as digital to analog or analog to digital conversions, encryption encoding and decoding, error correction, modulation and demodulation, upconversion and downconversion, and the like. FIG. 4 also illustrates a transmitter 206 and a receiver 604. Examples of these accompanying circuits or processes are described in greater detail later in connection with FIGS. 5 and 6.

A front end of a GPS receiver provides baseband I and Q signals 406 as an input to the hybrid GPS translator 204. It will be appreciated that Doppler shifts that are present in a GPS satellite's RF signal survives the downconversion to baseband. As described earlier in connection with FIG. 3, the bandwidth of the baseband I and Q signals 406 for C/A code can be about 1.8 MHz. The partial processing of the hybrid GPS translator 204 advantageously reduces the occupied bandwidth of the translated GPS signal as compared to the bandwidth of the baseband I and Q signals 406. In one embodiment, the front end of the hybrid GPS translator system, which provides the baseband I and Q signals 406, corresponds to a fast acquisition front-end. One example of such a fast acquisition front-end is described in U.S. Pat. No. 6,452,961 to Van Wechel, entitled MASSIVELY PARALLELED SEQUENTIAL TEST ALGORITHM, the entirety of which is hereby incorporated by reference herein. In one embodiment, the baseband I and Q signals 406 are provided in digital form.

In the GPS system, a satellite transmits its navigation data at a bit rate of 50 Hz with a pseudo-random noise (PN) code signal on a carrier of greater than 1 GHz. When a GPS receiver locks onto a code signal of a particular satellite, the receiver is said to have "acquired" the satellite. It will be understood that multiple fast acquisition front-ends for individual satellites can be coupled to multiple hybrid GPS translators. After the front-end of a hybrid GPS translator system has "acquired" a satellite, the hybrid GPS translator tracks the satellite with a frequency locked loop (FLL). The FLL provides the carrier frequency reference for later code demodulation and tracking.

The illustrated portion of the hybrid GPS translator 204 includes a phase rotator 408, an integrate and dump circuit 410, a frequency error detector 412, a frequency locked loop (FLL) filter 414, and a numerically controlled oscillator (NCO) 416. The phase rotator 408, the integrate and dump circuit 410, the frequency error detector 412, the FLL filter 414, and the NCO 416 form the FLL. Advantageously, a FLL can track a weak carrier signal with relatively greater lock range than is possible with a phase locked loop (PLL). In some conventional GPS receivers, an FLL is used as a pull-in device for PLL acquisition of a carrier signal due to the larger acquisition pull-in range of an FLL versus a PLL. Conventional GPS receivers can also switch between an FLL and a PLL depending on conditions. See Kaplan, E. D., *Understanding GPS Principles and Applications*, (Norwood, Artech House, 1996) ISBN 0-89006-793-7, Chapter 5, FIG. 5.21.

An FLL exhibits a larger tracking error than a PLL, which corrupts the delta range (DR) measurement. For example, DR measurements from an FLL exhibit errors in the tens of feet versus sub-inch errors for a PLL. Compensation techniques can be applied to uncorrupt the DR measurement, but these techniques are computationally complex and impractical to implement onboard. Advantageously, the hybrid GPS translator system offloads the relatively complex computations to hardware or software located in the remote station 404, where such computational resources are relatively less scarce.

The phase rotator 408 phase rotates the baseband I and Q signals 406 with the frequency of the NCO 416. The applied phase rotation can partially remove Doppler shift in the baseband I and Q signals 406 that originated from carrier Doppler shift. Where the baseband I and Q signals 406 are digital, the phase rotator 408 can be constructed from selector circuits that select between the I or the Q, and inverses thereof. The output of the phase rotator 408 is provided as an input to the integrate and dump circuit 410.

When the frequency of the NCO 416 is relatively close to the frequency of the baseband I and Q signals 406, the output of the phase rotator 408 changes relatively slowly. The integrate and dump circuit 410 integrates the output of the phase rotator 408 for a period of time. This period of time is referred to as an integration period. When the integrate and dump circuit 410 dumps the integrated output, the output corresponds approximately to the average phase angle from the phase rotator 408 over the integration period. Further details of the integrate and dump circuit 410, which can include correlation of acquisition codes, is described in greater detail later in connection with FIG. 8.

After the dump, the integrate and dump circuit 410 resets to zero to integrate for another integration period. It will be understood by one of ordinary skill in the art that a very broad range of values can be selected for the integration period. In one example, the integration period corresponds to about 5 milliseconds (mS) and is shown in Table 1 as item "correlator counts." In other embodiments, a 1 to 50 mS integration period is used. The output of the integrate and dump circuit 410 is provided as an input to the frequency error detector 412 and is also an output of the hybrid GPS translator 204.

The frequency error detector 412 or discriminator determines the frequency error between the frequency of the baseband I and Q signals and the frequency of the output of the NCO 416. It will be understood that the frequency error detector 412 should be synchronized with the integrate and dump circuit 410 such that the frequency error detector 412 computes or updates a calculation of the frequency error when the integrate and dump circuit 410 has provided an updated output. Conceptually, the frequency error is a computation of the difference in phase between successive outputs of the integrate and dump circuit 410 divided by the selected integration time ($\Delta$ phase/$\Delta$ time). A variety of appropriate frequency discriminators can be used. Appropriate frequency error detector circuits or frequency discriminators for use with both I and Q phases of the baseband signal include cross-product detectors, 2-quadrant arctangent detectors, and 4-quadrant arctangent detectors. The output of the frequency error detector 412, i.e., the frequency error, is provided as an input to the FLL filter 414.

In one embodiment, a 4-quadrant arctangent frequency discriminator is selected for the frequency error detector 412, and the operating range of the frequency error detector 412 is approximately $\pm\frac{1}{2}$ of the loop update rate ($\pm F_{sample}/2$) and generates an output value of $\pm\pi$ at these extremities. In one example, the value used for $F_{sample}$ is about 250 Hz with a loop update rate of about 5 mS to match the selected integration period. It will be understood that the loop update rate and the integration period can be selected within a very broad range. In this example, the maximum tracking error without cycle slips or loss of lock is about $\pm 125$ Hz, which is an acceptable error for a carrier frequency reference used for code tracking (assuming that the code loop is also updated at 250 Hz). The techniques disclosed herein permit the selection of FLL bandwidths that can track beyond 100 g's per second of jerk while maintaining a frequency tracking error of less than half the update rate.

In one embodiment, the FLL is capable of dynamic track in excess of 100 g's per second of jerk at a bandwidth consistent with the GPS signal-to-noise ratio. The FLL carrier tracking will typically be sufficiently accurate so as to establish a carrier frequency reference suitable for code demodulation. The tracking accuracy of the FLL need not be directly sufficient for direct use as a carrier phase or frequency measurement. The inaccuracies of FLL tracking can be at least partially compensated before carrier phase or frequency measurement. The hybrid GPS translator technique can be considered as a form of lossy compression.

The FLL filter 414 operates to smooth the response of the frequency error detector 412 and to increase the order of the FLL loop. The order and bandwidth of an FLL define its dynamic carrier frequency tracking performance. A first-order carrier tracking FLL is not stressed by velocity, but is stressed when a constant acceleration signal, i.e., a carrier frequency ramp, is provided as an input. A second-order carrier tracking FLL is not stressed to constant acceleration, but is stressed when a constant jerk (acceleration rate) signal (a carrier frequency exponential) is provided as an input. A second-order FLL is stressed in a manner similar to a third order PLL. In one embodiment, a first-order filter is selected as the FLL filter 414. Second-order FLL tracking errors will be described in greater detail later in connection with FIG. 7. In another embodiment, a third-order carrier tracking FLL is used.

The output of the FLL filter 414 is provided as an input to the NCO 416 and corresponds to a control word for the NCO 416. The frequency of the NCO 416 is thereby controlled by the output of the FLL filter 414 such that when the FLL is in lock with the baseband I and Q signals 406, the output of the FLL indicates the frequency of the baseband I and Q signals 406. The output of the FLL filter 414 is also an output of the hybrid GPS translator 204. In one embodiment, the output of the FLL filter 414 is a 28-bit control word and corresponds to a relatively steady-state measurement of the Doppler shift frequency of the baseband I/Q signals.

The outputs of the hybrid GPS translator 204 are provided to the remote station 404 via an RF downlink. The data from the hybrid GPS translator 204 (or groups of hybrid GPS translators) includes at least the frequency measurements or NCO control word signal 418, which is provided by the output of the FLL Filter 414 and further includes the baseband I-Q correlator outputs from the integrate and dump circuit 410, which contains the tracking errors of the FLL. The frequency measurements or NCO control word signal 418 corresponds to a corrupted delta range measurement, but still provides a carrier reference that is accurate enough to obtain a pseudo range measurement. The baseband I-Q correlator outputs provide an indication of the amount of corruption in the delta range measurement, and the baseband I-Q correlator outputs are advantageously transmitted to the remote station 404 and advantageously permit compensation for the corruption at a more convenient location, such as on the ground.

FIG. 4, this RF downlink is indicated by the dashed line 402. It will be understood that the outputs of multiple hybrid GPS translators for multiple GPS satellites can be combined, and the combined data can be sent to the remote station 404. Examples of accompanying circuits or processes that can be used to send data from the hybrid GPS translator 204 or groups thereof and the remote station 404 are described in greater detail later in connection with FIG. 5 and FIG. 6.

The remote station 404 can be located where certain constraints such as size, space, weight, and power constraints are relatively less severe. While the signal processing of the remote station 404 will be described in the context of signal processing performed in software, the skilled artisan will appreciate that such signal processing can also be carried out in dedicated hardware or in a combination of hardware and software.

In one embodiment, the remote station 404 tracks the carrier signals with a Phase Lock Loop (PLL) during moderate dynamics and with a frequency error estimating Fourier Transform during high dynamics. The hybrid GPS translator permits the computationally intensive Fourier Transform computations to be computed at the remote station 404, which is not subject to the space, weight, and power confines of a high-dynamic vehicle, or subject to possible destruction by a range safety officer.

The Fourier Transform measurements are used to correct the corresponding frequency measurements sent to the remote or ground equipment thereby reconstructing a relatively accurate delta-range measurement (based on phase). However, it will be understood that other configurations for the illustrated remote station 404 are also applicable, such as, for example, configurations that are entirely Fourier Transform based.

The illustrated remote station 404 includes a phase rotator 452, a Fast Fourier Transform (FFT)/peak search processor 454, a phase detector 456, a phase-locked-loop (PLL) filter 458, a PLL differencing circuit 460, an NCO 462, and an FFT differencing circuit 464.

The phase rotator 452, the phase detector 456, the PLL filter 458, the PLL differencing circuit 460, and the NCO 462 form the phase locked loop that tracks the carrier. Preferably, the PLL corresponds to a Costas PLL, which phase locks to both the I and Q phases. When lock is available from both the PLL and the FFT, i.e., during conditions of relatively low dynamics, use of the PLL is usually preferred because the PLL is less noisy and more accurate. In the illustrated embodiment, the remote station 404 switches between the PLL and the FFT based on a comparison in frequency between the PLL and the FFT. When the frequencies match to within a predetermined amount, such as, for example, within about 2 Hz, the remote station 404 uses the PLL. Otherwise, the remote station 404 uses the FFT. In other embodiments, the predetermined amount of frequency corresponds to a range between about 0.5 Hz to about 50 Hz.

The NCO control word signal 418 from the FLL filter 414 of the hybrid GPS translator 204 is downlinked to the remote station 404 and is provided to the PLL differencing circuit 460 and to the FFT differencing circuit 464 as a carrier reference. The downlinked baseband I/Q signal from the integrate and dump circuit 410 of the hybrid GPS translator 204 is downlinked to the phase rotator 452 for the PLL Doppler measurement and to the FFT/peak search processor 454 for the FFT Doppler measurement. The downlinked baseband I/Q signal provides an indication of the frequency error between the baseband I/Q and the frequency of the NCO 416. In one embodiment, the NCO control word signal 418 is provided in a relatively precise 28 bits, and the downlinked baseband I/Q signal is provided in a relatively coarse 8 bits. The NCO control word signal 418 can also be averaged as illustrated later in connection with FIG. 8 to decrease the amount of bandwidth consumed to relay the NCO control word signal 418. In one embodiment, the NCO control word signal 418 is transmitted relatively infrequently as an "absolute" or full control word with a relatively high amount of precision and relatively frequently with a "step" which represents the change in NCO control from the prior absolute control word.

The remote station 404 computes a PLL Doppler measurement as follows. When the phase locked loop is in lock, there is relatively little phase change at the output of the phase rotator 452. When the phase locked loop is out of lock, the software phase rotator will rotate phases or skip cycles. The phase rotator 452 rotates the downlinked baseband I/Q signal with the frequency of the NCO 462. Deviations in phase as measured by the phase rotator 452 are detected by the phase detector 456 and are filtered by the PLL filter 458. These deviations provide the PLL Doppler measurement that is valid when the PLL is in lock. When the PLL is not in lock, which can be indicated by a relatively large difference between the PLL Doppler measurement and the FFT Doppler measurement, the Doppler frequency indicated by the output of the PLL filter 458 can be ignored.

The output of the PLL filter 458 is also provided as an input to the PLL differencing circuit 460. The PLL differencing circuit 460 computes the difference between the output of the PLL filter 458 and the NCO control word signal 418 and provides the computed difference to the NCO 462. When the PLL is in lock, the frequency of the NCO 462 and the frequency of the downlinked baseband I/Q signal are relatively close. For example, when there is relatively little difference between the frequency of the NCO 416 and the frequency of the baseband I/Q, there is relatively little activity in the downlinked baseband I/Q signal, and the downlinked baseband I/Q signal will typically have relatively few frequency components or phase changes per time. In this situation, the NCO 462 should have a relatively low output frequency, which implies that the output of the PLL filter 458 and the NCO control word signal 418 for the NCO 416 will typically be relatively close. The difference between the output of the PLL filter 458 and the NCO control word signal 418 from the hybrid GPS translator advantageously compensates for the corruption in delta range from the FLL of the hybrid GPS translator.

The illustrated PLL configuration is applicable to a real-time process. Optionally, data from the downlinked baseband I/Q signal and the NCO control word signal 418 can be stored for later, post-mission analysis. During these non real-time analysis, the downlinked baseband I/Q signal and NCO control word signals can be repetitively played back and using data from previous runs, the carrier loop can be steered in on the signal that allows a continuous Costas PLL tracking. Also, vehicle dynamics provided by less accurate sources, such as by FFT Doppler measurements or by radar tracking, can also be used to steer the carrier loops and effectively increase the dynamic range of the PLL. In addition, the carrier loop bandwidths can be further reduced to produce a more noise-free range rate measurement. Moreover, GPS signals from other satellites in view of the hybrid GPS translator but not tracked in real time can also be used to improve accuracy in non-real time analysis.

By contrast, a conventional GPS translator may disadvantageously provide only the range and range rate measurements for post mission processing. Additional forward and backward smoothing can be performed on these measurements, but when tracking loops lose track, no information is available.

The remote station 404 computes an FFT Doppler measurement as follows. The downlinked baseband I/Q signal is provided via a downlink to the FFT/Peak Search processor 454. The FFT/Peak Search processor 454 includes a computation of a Fast Fourier Transform (FFT) to detect frequencies present in the downlinked baseband I/Q signal. It will be understood that the time constants associated with the FFT/Peak Search processor 454 can be relatively long compared the integration time of the integrate and dump circuit 410. After computation of the FFT, the calculated frequency bins are searched for the "peak" frequency, i.e., the highest magnitude frequency component of the downlinked baseband I/Q signal. This frequency component, appropriately scaled to the same scale as the NCO control word signal 418, is subtracted from the NCO control word signal 418 by the FFT differencing circuit 464 to generate the FFT Doppler measurement. The FFT Doppler measurement is valid for a relatively larger dynamic range than the PLL Doppler measurement, and can thus be used in situations when the PLL Doppler measurement is not valid. However, the FFT Doppler measurement exhibits more noise than the PLL Doppler measurement. One of ordinary skill in the art will appreciate that a Discrete Fourier Transform (DFT) can also be computed instead of the FFT.

In addition, the wider lock range of the FLL can be utilized to initialize the PLL. The frequency steps induced by the FLL are removed by the FFT computations in the remote station 404. As a result, the PLL in the remote station 404 performs as though it is working independently, producing measurements with noise of the PLL only. During PLL initialization, the FLL integrator states are jammed into the PLL filter integrators (with proper scaling), such that the absolute satellite Doppler is maintained and loop settling is minimized.

When tracking via the PLL is achieved, the PLL's frequency measurement forms the true satellite's (space vehicle's) carrier frequency. GPS telemetry bit sync is also determined, then sub frame sync, allowing the formation of the transmit time (i.e. pseudo range) of the satellite. In one embodiment, a Kalman filter is then used to determine the tracked vehicle's state vector.

Figure 5:
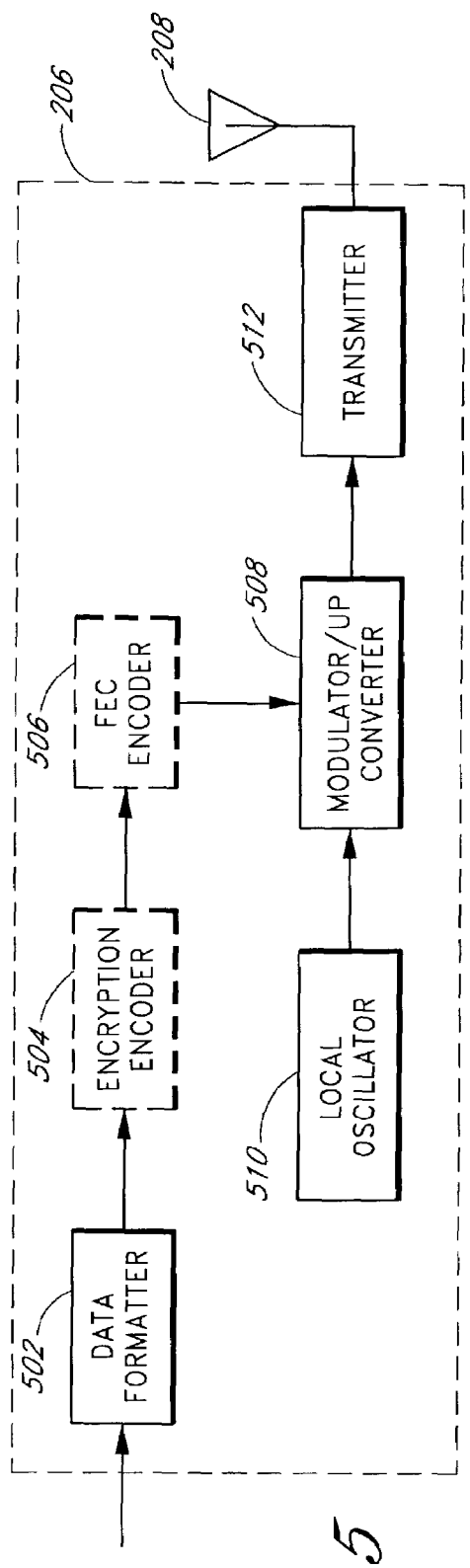
FIG. 5 illustrates one example of a transmitter for a hybrid GPS translator.

FIG. 5 illustrates one example of the transmitter 206. The illustrated transmitter 206 includes a data formatter 502, an encryption encoder 504, a forward error correction (FEC) encoder 506, a modulator/upconverter circuit 508, a local oscillator 510, and a transmitter 512. It will be understood that some of the circuits illustrated in FIG. 5 are optional and that the circuits of the transmitter 206 can be rearranged in a variety of configurations.

The outputs of the hybrid GPS translator 204 are provided as inputs to the data formatter 502. In one embodiment, the outputs of 12 hybrid GPS translators (to translate the GPS signals of up to 12 tracked GPS satellites) are provided to the data formatter 502. The data formatter 502 can combine the multiple outputs of hybrid GPS translators, can combine the outputs of hybrid GPS translators with the outputs of other devices, such as telemetry devices, can provide headers and/or field delimiters to separate the data, can arrange the data to a serial format, can provide parity bits, etc. It will be understood that the configuration of the data formatter 502 will vary based on the specified data format of the hybrid GPS translator system. The output of the data formatter 502 can optionally be provided to the encryption encoder 504. The encryption encoder 504 can be used to keep the tracking data provided by the hybrid GPS translator system relatively private.

The output of the data formatter 502 or the encryption encoder 504 can optionally be provided as an input to the FEC encoder 506. The FEC encoder advantageously improves the robustness of the transmitted tracking data. In one embodiment, convolutional codes are used by the FEC encoder 506. The output of the data formatter 502, the encryption encoder 504, or the FEC encoder 506 is provided as an input to the modulator/upconverter circuit 508. It will be understood by one of ordinary skill in the art that the modulator/upconverter circuit 508 can first modulate the data to an intermediate frequency baseband and then upconvert to RF or can modulate directly to RF. The local oscillator 510 is mixed by the modulator/upconverter circuit 508 with an IF baseband or is directly modulated to generate a modulate RF carrier that is provided as an input to the transmitter 512. In one embodiment, the modulated RF carrier is in S-band and the modulation technique is Feher Offset Quadra-Phase Shift Key (FOQPSK), but it will be understood that the modulated RF carrier can correspond to any frequency spectrum or modulation technique as specified by the system requirements. Other examples of modulation techniques include m-ary PSK, MSK, FM techniques, etc. The transmitter 512 amplifies the modulated RF carrier, and the signal is broadcast over the hybrid translator antenna 208.

Figure 6:
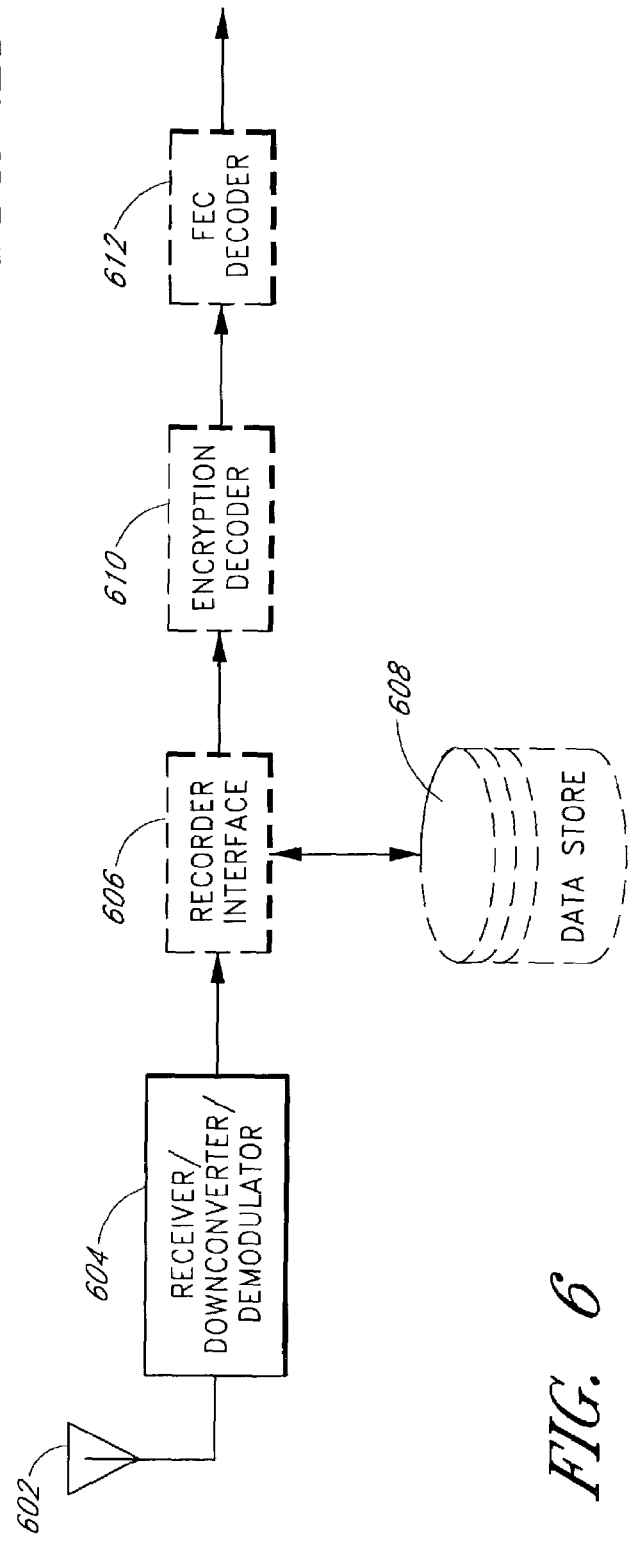
FIG. 6 illustrates one example of a translator message receiver for a hybrid GPS translator processor.

FIG. 6 illustrates one example of a translator message receiver for a hybrid GPS translator processor. Many variations of the translator message receiver are possible and the artisan will appreciate that many of the circuits illustrated in FIG. 6 can be optional. It will be understood that the configuration of the translator message receiver should correspond with and complement the selected configuration of the transmitter 206. The modulated RF carrier that contains the tracking data from the hybrid GPS translator 204 is received by an antenna 602. It will be understood that the antenna 602 should operate in the frequency band of the RF carrier and that existing antennas that are already present in a testing environment can be reused.

A receiver/downconverter/demodulator circuit 604 downconverts and demodulates the modulated RF carrier. The output of the receiver/downconverter/demodulator circuit 604 can optionally be provided to a recorder interface 606, which stores the tracking data in a data store 608. It will be understood that the data can be stored prior to or after encryption decoding or FEC decoding. The data store 608 can correspond to a broad range of memory devices, and in one embodiment, a redundant array of inexpensive disks (RAID) is used to store the tracking data. The storage of the tracking data can advantageously be used for relatively complicated signal processing techniques that can be impractical to implement in real time.

The output of the receiver/downconverter/demodulator circuit 604 or the recorder interface 606 is provided as an input to an optional encryption decoder 610 and to an optional FEC decoder 612. It will be understood that whether the encryption decoder 610, the FEC decoder 612, or both are present in a particular translator message receiver depends on whether the corresponding hybrid translator data is encrypted or FEC encoded. The output of the receiver/downconverter/demodulator circuit 604, the recorder interface 606, the encryption decoder 610, or the FEC decoder 612 is provided as an input to the back-end processing at the remote station 404 for further processing as described earlier in connection with FIG. 4.

Figure 7:
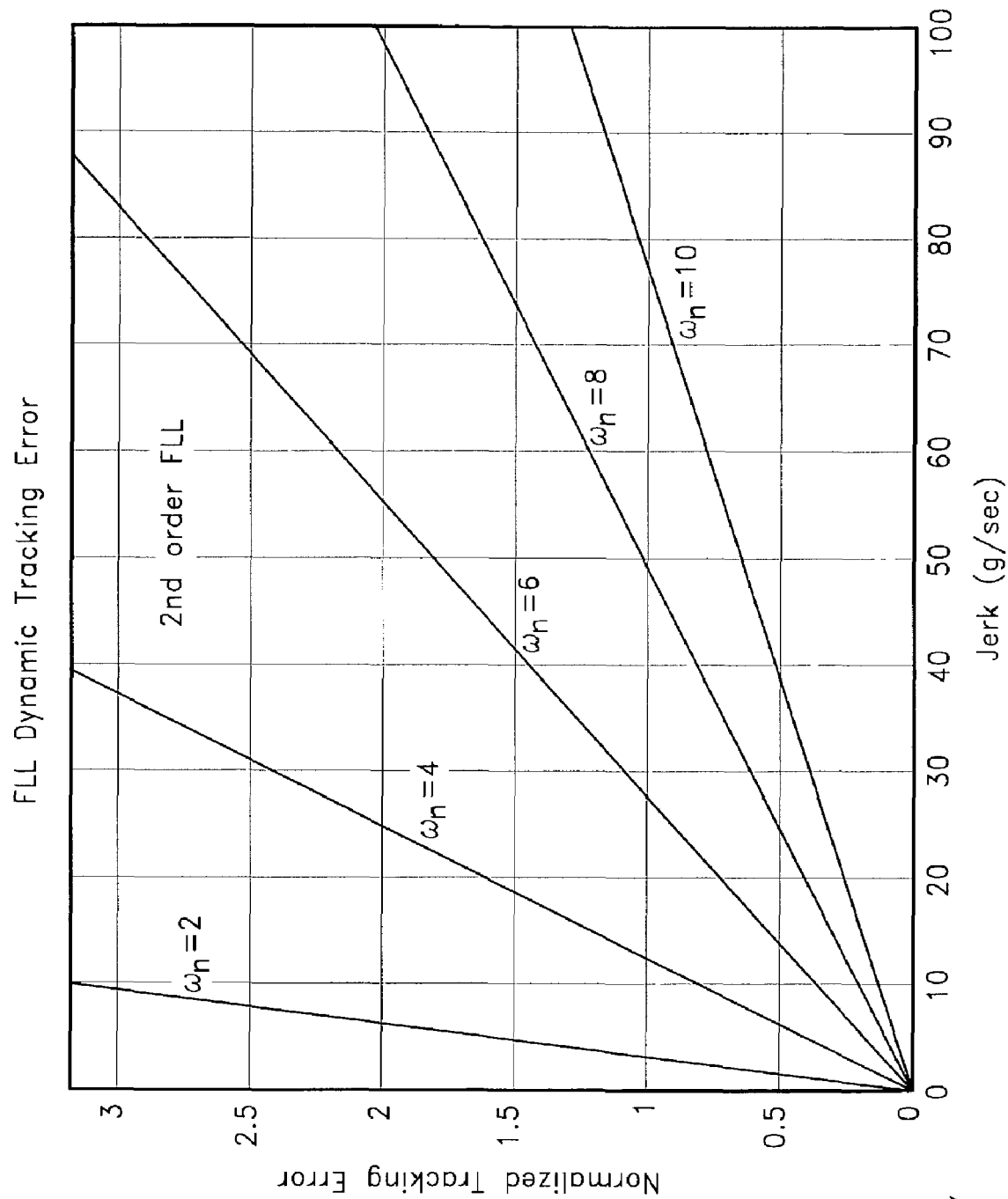
FIG. 7 illustrates a plot of second-order FLL tracking errors.

FIG. 7 illustrates a plot of second-order FLL tracking errors. In Equation 1, $\Delta \dddot{\omega}$ corresponds to the jerk-induced carrier frequency shift in rad/sec$^3$, and $\omega_n$ corresponds to the natural frequency of the FLL in rad/sec. In FIG. 7, a horizontal axis indicates an amount of jerk (change in acceleration per time). A vertical axis indicates a normalized tracking error. The tracking error versus jerk is shown for a variety of natural frequencies for a FLL. The steady-state jerk-induced frequency error ($\dot{\phi}_j$) in a second-order FLL is expressed in Equation 1 and plotted in FIG. 7.

$$\dot{\phi}_j = \frac{\Delta \dddot{\omega}}{\omega_n^2} (rads/\sec) \quad \text{(Eq. 1)}$$

Figure 8:
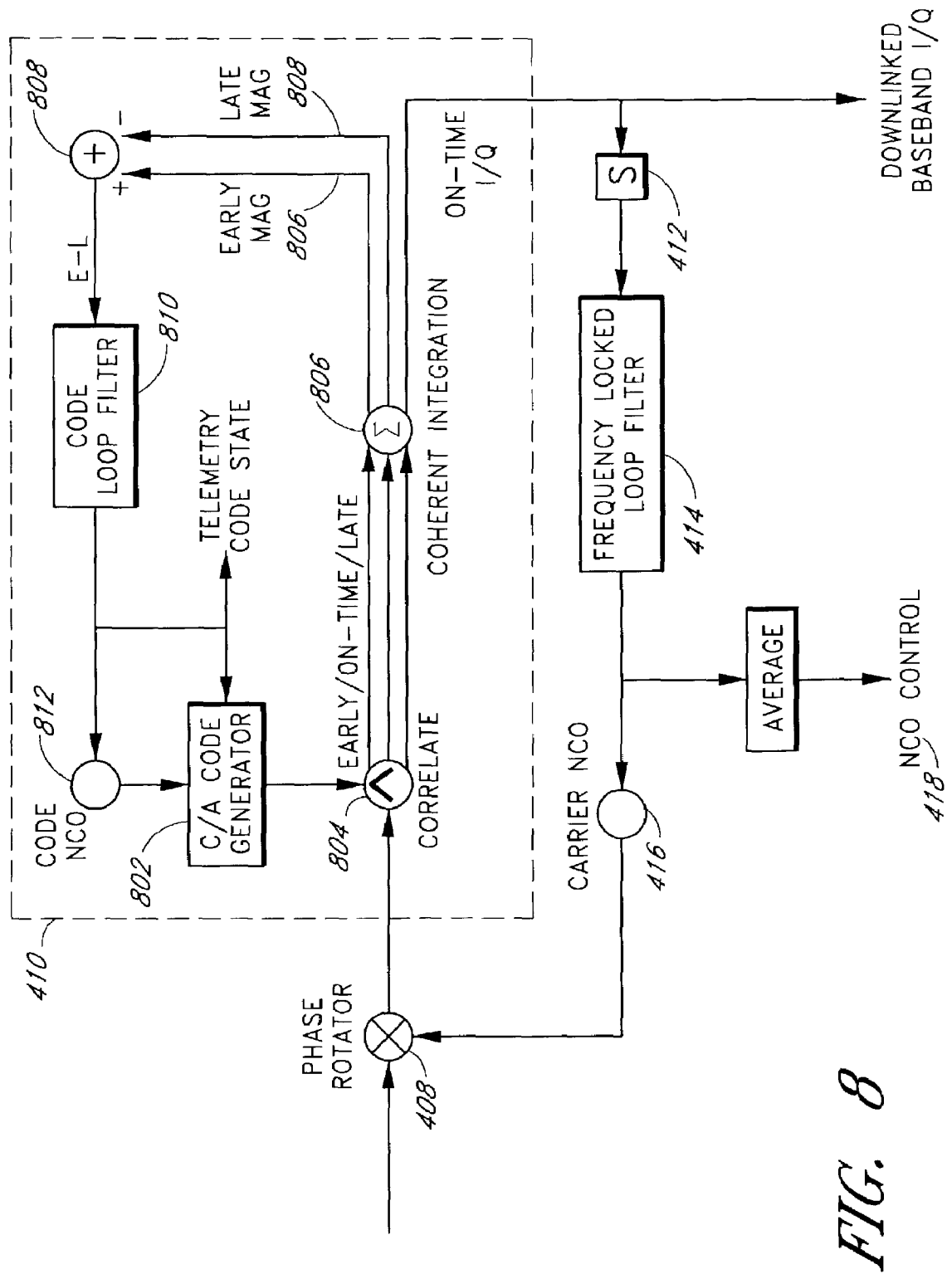
FIG. 8 illustrates a block diagram of a hybrid GPS translator system with more details of an integrate and dump circuit.

FIG. 8 illustrates a block diagram of a hybrid GPS translator system with more details of the integrate and dump circuit 410 described earlier in connection with FIG. 4. After searching and acquiring a satellite (ahead of the hybrid GPS translator in the data flow), the satellite is tracked with a code loop, which is part of the integrate and dump circuit 410, and is tracked with the high-dynamic carrier FLL. The code loop illustrated in FIG. 8 can be implemented in hardware, in software, or by a combination of both. Although FIG. 8 describes the integrate and dump circuit 410 in the context of a coarse acquisition (C/A) mode code loop, the artisan will appreciate that the structure disclosed in FIG. 8 applies equally to other modes, such as precise P(Y) mode.

The code tracking loops in the conventional GPS receiver are normally rate-aided by the carrier PLL. When the carrier PLL is properly tracking, the carrier PLL leaves no rate error in the code loop. For this reason, the code Delay Locked Loop (DLL) in a conventional GPS receiver is first order, since the DLL only contends with correcting any code state bias when the tracking loop acquires the signal.

Dynamics associated with code tracking are scaled down from carrier tracking by the ratio of their frequencies. For C/A code operation, the code rate of change associated with vehicle motion is 1/1540 of the L1 carrier. Using the carrier FLL, with a maximum tracking error of ±125 Hz, to rate aid the code loop results in a worst-case C/A code rate error of about ±0.081 chips/second. This can be tracked with a second-order DLL, which can be implemented in software. The resulting pseudo-range measurements, i.e., the FLL frequency measurement, are then provided as outputs from the hybrid GPS translator 204 and linked to the remote station 404.

A C/A code generator 802 generates multiple C/A codes. In this example, the C/A code generator 802 generates three C/A codes, each of which is slightly delayed in time from the other. A correlator circuit 804, which can correspond to digital matched filters, compares the data stream from the phase rotator 408 to the codes generated by the C/A code generator 802. In response to the comparison, the correlator circuit 804 provides an indication of early, late, or on-time synchronization between the code loop and the received codes. The early, late, and on-time indications are provided to a coherent integration circuit 806. In one embodiment, the coherent integration circuit 806 integrates for a time period of about 5 mS. In one embodiment, the early and the late indications are integrated and are used to speed up or slow down the code loop via a summing circuit 808 and a code loop filter 810. The output of the code loop filter 810 is provided as an input to a code NCO 812, which controls a rate at which the codes are generated by the C/A code generator 802. In one embodiment, the C/A code states (pseudo-range measurements) from the code loop filter 810 are also relayed to the remote station 404, which can be conveniently located on the ground. Of course, the code states that are relayed from the code loop filter 810 can correspond to another code state, such as P(Y) code states, as applicable.

Bit Synchronization

In one embodiment, the satellite navigation data can be demodulated in the hybrid GPS translator via a process that is frequency insensitive. This navigation data is relayed from the hybrid GPS translator 204 to the remote station 404, and can advantageously be applied to the I/Q data to remove modulation phase shifts. This bit synchronization can permit up to 6 dB of additional tracking threshold. Bit synchronization and related transmit time resolution can also advantageously be performed using a frequency insensitive bit synchronization process.

The frequency insensitive process uses two running, adjacent in time, coherently integrated complex correlator data windows. The windows can be of fixed length or of variable length, and support the desired bit sync error rate and/or carrier frequency error tolerance. Periodically, such as every millisecond, a phase measurement is taken between the two windows. The period used to take the phase measurement can vary in a broad range. In other embodiments, the phase measurement is taken in a range between about 0.5 mS to about 50 mS. In one example, a dot product is used to calculate the phase measurement. The dot product is CPU-efficient and generates positive values for phase angles less than ±90 degrees, and negative values for angles larger than this. These phase measurements can be accumulated in modulo-20-millisecond (inverse of 50 Hz) bins over a period selected for a desired reliability of bit synchronization. The bin with the largest accumulated phase, e.g., minimum value for dot product method, is used along with the C/A code state to determine the location in time of the GPS telemetry data bit edge transitions. This timing information is used for proper demodulation processing and satellite transmit time 1 millisecond ambiguity resolution.

A similar method can advantageously be utilized in demodulation processing. For demodulation, bit sync can first be determined, and then two coherent windows straddled about the determined bit edge are provided as inputs to a phase estimator. The dot product can again be used for the phase estimator, and the dot product provides negative values when a bit changes state. These state changes are provided as outputs as the demodulated bit stream. The windows can be of fixed length or of variable length, to support the desired bit error rate and/or carrier frequency error tolerance.

Calculation of Hybrid Translator Re-Transmission Bandwidth

One advantage of the hybrid GPS translator is a reduction in the amount of down link bandwidth as compared to a conventional GPS translator. Detection, acquisition, and frequency lock loops on the vehicle are used to detect, correlate, and convert L-band RF to baseband. The coherently integrated on-time correlator counts are down linked to a ground station, along with FLL frequency/phase hardware controls and C/A code states produced from the hybrid GPS translator's code loops.

One example of telemetry data for one channel is illustrated in Table 1. In the example, the integration period corresponds to 5 mS, but it will be understood that the integration period can be selected within a broad range including less than 1 mS and greater than 50 mS. In this example, one channel can advantageously be translated with only about 6020 bits per second. If, for example, twelve channels of telemetry data are combined, these 12 channels can be translated with only 6020×12=72240 bits/second. It will be understood that additional bits can be added for information such as track status, parity, encryption, error correction, and the like. However, the total down link data rate is less than 100 kilobits/second, which is advantageously about 40 times less than a conventional GPS translator. In one embodiment, the Absolute Carrier NCO Frequency Control, the Carrier NCO Phase Control, and the Carrier NCO Frequency Step referred to below are related to outputs of the FLL. For example, the Absolute Carrier NCO Frequency Control can correspond to full control word for an NCO. The Carrier NCO Frequency Step, which can be transmitted more often than Absolute Carrier NCO Frequency Control, the can correspond to a relatively small deviation from the Absolute Carrier NCO Frequency Control. When the Carrier NCO Frequency Step is combined with the Absolute Carrier NCO Frequency Control, the combination can reveal the control word used by the NCO 416.

TABLE 1

| Data Item | Rate (measurements per second) | Bits per Measurement | Bits per second |
|---|---|---|---|
| Correlator Counts (5 millisecond dwells) | 200 | 2 phases (I + Q) × 8 bits | 3200 |
| Code state | 20 | 24 bits | 480 |

TABLE 1-continued

| Data Item | Rate (measurements per second) | Bits per Measurement | Bits per second |
|---|---|---|---|
| Absolute Carrier NCO Frequency Control | 20 | 28 bits | 560 |
| Carrier NCO Phase Control | 20 | 9 bits | 180 |
| Carrier NCO Frequency Step (5 milliseconds) | 200 | 8 bits | 1600 |
| Total per Channel | | | 6020 |
| | | ×12 Channels | 72240 |

Various embodiments of the invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A hybrid GPS translator adapted to relay a semi-processed, reduced-bandwidth GPS signal, the hybrid GPS translator comprising:
    a frequency-locked loop (FLL) configured to provide a frequency measurement associated with baseband I and Q signals, wherein the baseband I and Q signals are downconverted from a GPS carrier signal, the FLL being configured to provide a first signal indicating a frequency error between the baseband I and Q signals and a second signal whose frequency corresponds to the frequency measurement; and
    an interface circuit coupled to the FLL to receive the frequency error and the frequency measurement, wherein the interface circuit is adapted to couple to a downlink circuit that can transmit the frequency error and the frequency measurement to a remote location.

2. The hybrid GPS translator as defined in claim 1, wherein the frequency locked loop (FLL) is configured as a second-order FLL.

3. The hybrid GPS translator as defined in claim 1, wherein the frequency locked loop (FLL) is configured as a third-order FLL.

4. The hybrid GPS translator as defined in claim 1, further comprising the downlink circuit, wherein the downlink circuit comprises:
    a data formatter coupled to the interface circuit and to one or more other hybrid GPS translators, where the data formatter is configured to arrange data from the hybrid GPS translators for transmission via a downlink.

5. The hybrid GPS translator as defined in claim 4, further comprising a modulator-upconverter that is configured to provide an RF carrier signal that is modulated with data from the data formatter such that the data can be transmitted.

6. The hybrid GPS translator as defined in claim 5, further comprising an encryption encoder disposed between the data formatter and the modulator-upconverter.

7. The hybrid GPS translator as defined in claim 5, further comprising a forward error correction (FEC) encoder disposed between the data formatter and the modulator-upconverter.

8. The hybrid GPS translator as defined in claim 5, further comprising an RF power amplifier coupled to the modulator and upconverter circuit.

9. The hybrid GPS translator as defined in claim 8, further comprising an antenna coupled to the RF power amplifier.

10. The hybrid GPS translator as defined in claim 1, further comprising an input circuit configured to receive at least one set of baseband I and Q signals.

11. The hybrid GPS translator as defined in claim 1, wherein the FLL comprises an integrate and dump circuit having a code tracking loop.

12. The hybrid GPS translator as defined in claim 11, wherein an integration period for the integrate and dump circuit is about 5 milliseconds.

13. The hybrid GPS translator as defined in claim 11, wherein an integration period for the integrate and dump circuit is between 1 and 50 milliseconds.

14. The hybrid GPS translator as defined in claim 11, wherein the integrate and dump circuit integrates phase differences between the baseband I and Q signals and the second signal.

* * * * *